(No Model.)
J. W. GAMBLE.
DRAFT EVENER.
No. 380,755. Patented Apr. 10, 1888.
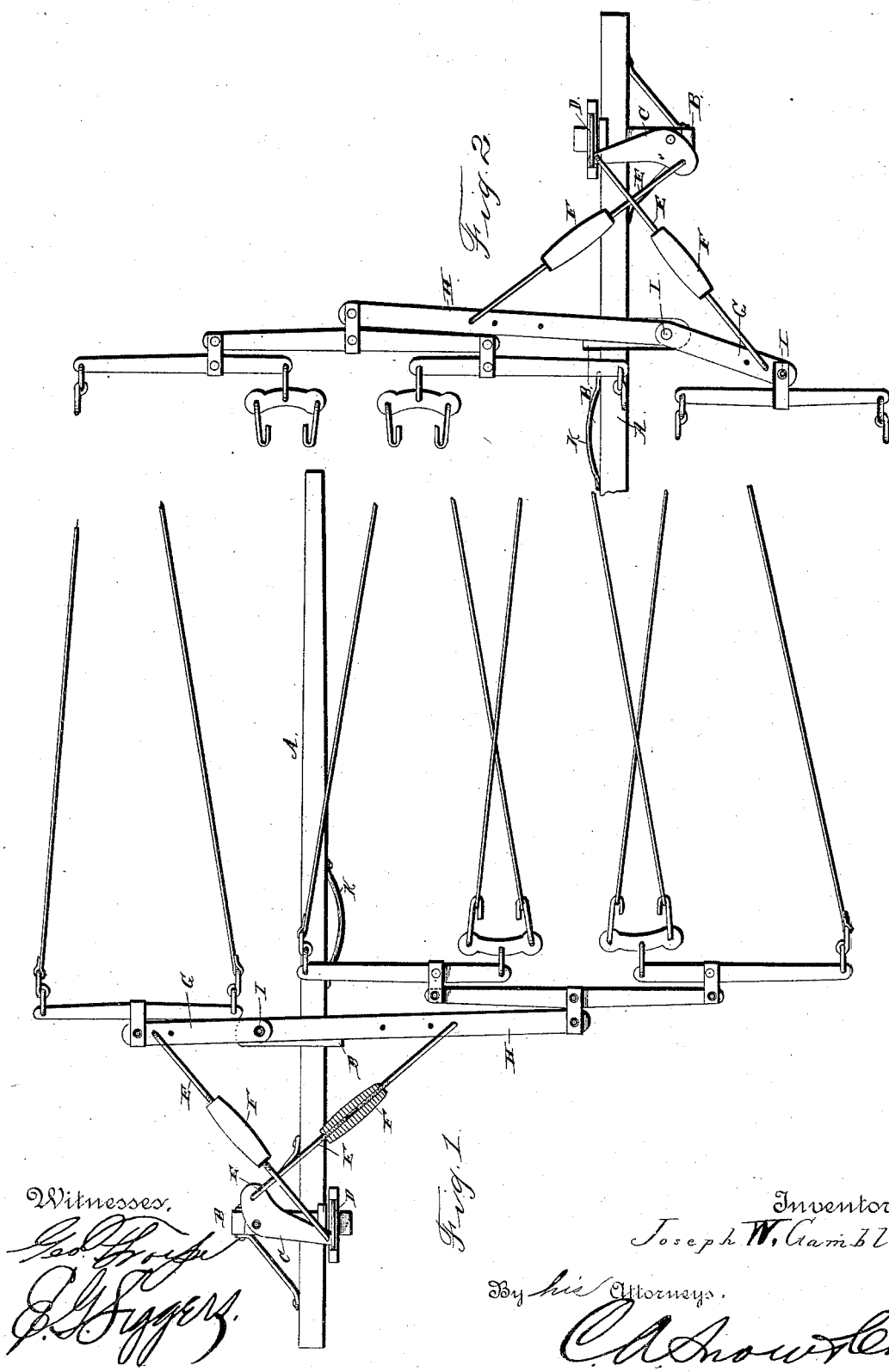
Witnesses.
Inventor.
Joseph W. Gamble.
By his Attorneys.
N. PETERS, Photo-Lithographer, Washington, D. C.

United States Patent Office.

JOSEPH W. GAMBLE, OF ADAIR, IOWA, ASSIGNOR OF ONE-HALF TO JACOB McCARNEY, OF SAME PLACE.

DRAFT-EVENER.

SPECIFICATION forming part of Letters Patent No. 380,755, dated April 10, 1888.

Application filed February 4, 1888. Serial No. 263,058. (No model.)

*To all whom it may concern:*

Be it known that I, JOSEPH W. GAMBLE, a citizen of the United States, residing at Adair, in the county of Adair and State of Iowa, have invented a new and useful Improvement in Draft-Eveners, of which the following is a specification.

My invention relates to improvements in draft-eveners; and it consists in certain novel features hereinafter described and claimed.

In the accompanying drawings, Figure 1 is a plan view of my improved draft-evener, and Fig. 2 is a similar view showing the parts in a different position.

Referring to the drawings by letter, A designates the tongue, of any desired size.

B B designate two laterally-projecting brackets secured to the tongue at and near the rear end of the same. Upon the upper side of the rear bracket, at the end of the longer arm of the same, I pivot a bell-crank lever, C, the shorter arm of which extends forward, and the longer arm of which extends to one side above the bracket, its end working in a keeper, D, secured to the end of the shorter arm of the bracket. To the ends of the lever C, I pivot the ends of the connecting-rods E, which extend forward to the evener-bars. These connecting-rods are made in two sections, the adjacent ends of the sections being screw-threaded and inserted in the opposite ends of sleeves F, which are internally screw-threaded, and are adapted to be turned so as to lengthen or shorten the connecting-rods, as will be readily understood, to suit the requirements of the case. These connecting-rods cross each other as they extend forward, and their front ends are adjustably secured to the evener-bars G H, which are pivoted to the end of the longer arm of the forward bracket, B, by a common pivot-pin, I, as shown. The longer arms of both brackets B are on the same side of the tongue, and the pivotal points of the evener-bars and the plate C are consequently both on the same side of the tongue. The shorter evener-bar, G, is connected to the longer arm of the plate C, and the longer evener-bar extends across the tongue and is connected to the shorter arm of the said plate.

To the end of the evener-bar G, I secure a singletree, and to the end of the longer evener-bar, H, I secure a doubletree, to the ends of which I secure singletrees, as shown. To the inner adjacent ends of these latter singletrees I secure smaller singletrees, so as to permit the employment of three horses.

K designates a guard secured to the side of the tongue to prevent the main singletree slipping off the tongue.

In the accompanying drawings I have shown the different positions of my device according to the inequalities in the draft, and it is thought the advantages of the device will be apparent from the drawings and the foregoing description.

Having thus described my invention, what I claim, and desire to secure by Letters Patent, is—

1. The combination of the tongue, the brackets secured thereto and projecting to one side thereof, the evener-bars pivoted to the forward brackets by a common pivot, the plate C, pivoted on the rear bracket, and the adjustable connecting-rods between the evener-bars and the plate C, as set forth.

2. The combination of the tongue, the brackets secured thereto and projecting to one side thereof, the evener-bars pivoted on the forward bracket, the plate C, pivoted on the rear bracket, the crossed connecting-rods between the said plates and the evener-bars, and the adjustable sleeves mounted on said rods to lengthen and shorten the same, as set forth.

3. The combination of the tongue, the brackets secured thereto, the evener-bars pivoted on the forward bracket, the plate C, pivoted on the rear bracket, the adjustable connecting-rods between the said plate and the evener-bars, and the keeper D, secured on the rear bracket over the end of the plate C, substantially as specified.

In testimony that I claim the foregoing as my own I have hereto affixed my signature in presence of two witnesses.

JOSEPH W. GAMBLE.

Witnesses:
   J. A. STEPHENS,
   W. F. WILLIAMS.